US012687225B2

(12) United States Patent
Cihlar et al.

(10) Patent No.: US 12,687,225 B2
(45) Date of Patent: Jul. 21, 2026

(54) PLANETARY GEAR SYSTEM

(71) Applicant: Neugart GmbH, Kippenheim (DE)

(72) Inventors: Bernd Cihlar, Mahlberg (DE);
Dominik Wolters, Mahlberg (DE)

(73) Assignee: Neugart GmbH, Kippenheim (DE)

( * ) Notice: Subject to any disclaimer, the term of this
patent is extended or adjusted under 35
U.S.C. 154(b) by 1 day.

(21) Appl. No.: 18/854,688

(22) PCT Filed: Feb. 1, 2023

(86) PCT No.: PCT/EP2023/052382
§ 371 (c)(1),
(2) Date: Oct. 7, 2024

(87) PCT Pub. No.: WO2023/198333
PCT Pub. Date: Oct. 19, 2023

(65) Prior Publication Data
US 2025/0224031 A1 Jul. 10, 2025

(30) Foreign Application Priority Data
Apr. 14, 2022 (DE) ..................... 10 2022 109 201.1

(51) Int. Cl.
*F16H 57/08* (2006.01)
*F16H 57/023* (2012.01)

(52) U.S. Cl.
CPC ......... *F16H 57/082* (2013.01); *F16H 57/023*
(2013.01); *F16H 2057/085* (2013.01)

(58) Field of Classification Search
CPC ............... F16H 57/082; F16H 57/0025; F16H
57/0023; F16H 2057/085; F16H 1/28;
F16H 2001/2881
See application file for complete search history.

(56) References Cited

U.S. PATENT DOCUMENTS

| | | | |
|---|---|---|---|
| 2,868,040 A | 1/1959 | Chamberlin | |
| 5,533,943 A | 7/1996 | Ichioka et al. | |
| 2002/0049108 A1 | 4/2002 | Hosle | |
| 2015/0323057 A1* | 11/2015 | Kim ................... | F16H 57/0482 |
| | | | 475/159 |
| 2019/0331211 A1* | 10/2019 | Niepceron ............ | F16H 57/023 |
| 2020/0200236 A1* | 6/2020 | Wüstenberg .......... | F16H 57/082 |

FOREIGN PATENT DOCUMENTS

| | | |
|---|---|---|
| DE | 199 56 789 A1 | 5/2001 |
| DE | 101 44 805 A1 | 4/2003 |
| DE | 102 54 527 A1 | 6/2004 |
| DE | 10 2019 108 323 A1 | 10/2020 |
| JP | 5936472 | 6/2016 |
| WO | 2015185036 A1 | 12/2015 |

* cited by examiner

*Primary Examiner* — Lori Wu

(74) *Attorney, Agent, or Firm* — Grogan, Tuccillo &
Vanderleeden, LLP

(57) ABSTRACT

The invention relates to an epicyclic gear with a housing, a
sun gear, a planet carrier, at least one planet gear and a ring
gear. The planet carrier is rotatably mounted in the housing.
The housing defines an assembly direction for mounting the
planet carrier. A bearing seat of the planet carrier, which
serves for the rotatable mounting of the planet carrier in the
housing and which is arranged adjacent to an insertion end
of the planet carrier and in the use position of the planet
carrier in the assembly direction behind the ring gear, has a
diameter which is smaller than an inner diameter, in par-
ticular than a tip diameter, of the ring gear.

15 Claims, 5 Drawing Sheets

PLANETARY GEAR SYSTEM

CROSS-REFERENCE TO RELATED APPLICATIONS

This application is a national stage of International Application No. PCT/EP2023/052382 filed on Feb. 1, 2023, which claims priority to German Patent Application No. 10 2022 109 201.1 filed Apr. 14, 2022, both of which are hereby incorporated by reference in their entirety.

FIELD OF THE INVENTION

The invention relates to a planetary gear system with a housing, a sun gear, a planet carrier, at least one planet gear and a ring gear, wherein the planet carrier is rotatably mounted in the housing.

BACKGROUND OF THE INVENTION

For example, such planetary gear systems are known in practice as planetary gears and enable high transmission ratios with low space requirements due to their compact design. Thus these planetary gear systems are suitable for use as gearboxes for industrial robots.

For example, from the publication WO 2015/185 036 A1 a planetary gear is already known, which has a split planet carrier. The parts of the split planet carrier are inserted into the housing of the planetary gear from two different sides and then joined together. Due to the available space, however, this can be associated with certain effort and lead to a loss of quality.

It is the object of the invention to provide a planetary gear system of the type mentioned at the beginning which is easy to assemble.

SUMMARY OF THE INVENTION

For the solution of the object, a planetary gear system with the means and features of the independent claim is proposed. In particular, a planetary gear system is thus proposed for solving the object having a housing, a sun gear, a planet carrier, at least one planet gear and a ring gear, wherein the planet carrier is rotatably mounted in the housing, the housing defines an assembly direction for assembly of the planet carrier and the planet carrier has a bearing seat on its outer side which is arranged adjacent to an insertion end of the planet carrier and behind the ring gear of the planetary gear system in assembly direction in the use position of the planet carrier and has an outer diameter which is smaller than an inner diameter, in particular than an addendum circle diameter of the ring gear.

In this way it is possible to insert the planet carrier from a side into its use position within the housing of the gearbox. A two-sided assembly, as previously known from the planetary gear system known from the prior art, and an associated division of the planet carrier can be avoided in this way. Thus, the planet carrier can for example be formed in one piece or, if it is formed in two or in several parts, can still be mounted outside the housing of the planetary gear system. This can considerably simplify assembly of the planetary gear system and increase precision.

The aforementioned bearing seat can be referred to as the rear or distal bearing seat of the planet carrier. A pivot bearing of the planetary gear system can be arranged on the bearing seat for rotatable mounting of the planet carrier in the housing.

Furthermore, according to the invention, it is provided that a bearing seat of the planet carrier, which is arranged in front of the ring gear and/or adjacent to an end of the planet carrier facing away from the insertion end in the assembly direction and in the use position of the planet carrier, has a diameter which is larger than the inner diameter, in particular than the addendum circle diameter, of the ring gear and/or larger than a diameter of the bearing seat of the planet carrier adjacent to the insertion end. The at least one planet gear is designed as a stepped planet gear and has two bearing seats and at least two toothings, namely a sun gear toothing meshing with the sun gear and a ring gear toothing meshing with the ring gear. The ring gear toothing of the planet gear is arranged between the two bearing seats of the planet gear. One of the two bearing seats of the planet gear is arranged between an insertion end of the planet gear and the ring gear toothing, wherein this bearing seat has an outer diameter that is smaller than the outer diameter of the ring gear toothing. The other bearing seat of the two bearing seats of the planet gear is arranged between the ring gear toothing and the sun gear toothing of the planet gear.

The housing can have a planet carrier holder with an insertion opening for the planet carrier, through which the assembly direction of the planet carrier is defined. The planet carrier can then be rotatably mounted inside the housing in the planet carrier holder. At least one bearing seat of a pivot bearing for the planet carrier can be formed inside the planet carrier holder. The ring gear of the planetary gear system can also be arranged inside the planet carrier holder. The ring gear can be arranged or formed to be non-rotatable within the housing, in particular within the planet carrier holder of the housing, and/or on the housing.

The planet carrier can have on its outer side in relation to its axis of rotation two axially spaced apart bearing seats for the rotatable mounting of the planet carrier. This facilitates a uniform transmission of force between the planet carrier and the housing. When the planet carrier is in the operating position within the housing, the ring gear of the planetary gear system can be arranged between the two bearing seats. The bearing seats can be formed on an outer side of the planet carrier. Pivot bearings can be arranged on the bearing seats for rotatable mounting of the planet carrier in the housing.

As previously mentioned, the planet carrier has, according to the invention, a bearing seat which is arranged in the assembly direction and in the use position of the planet carrier in front of the ring gear and/or adjacent to an end of the planet carrier facing away from the insertion end. This bearing seat can be referred to as the front or proximal bearing seat of the planet carrier and can be formed on an outer side of the planet carrier. According to the invention, this bearing seat has, as previously mentioned, a diameter which is greater than the inner diameter, in particular than the addendum circle diameter of the ring gear and/or is larger than a diameter of the rear bearing seat of the planet carrier adjacent to the insertion end.

The planet carrier can have a shaft, in particular an output shaft, or be designed as a shaft, in particular as an output shaft, of the planetary gear system.

The at least one planet gear of the planetary gear system can be rotatably mounted in the planet carrier. The at least one planet gear can mesh with the sun gear and/or with the ring gear of the planetary gear system. In particular in the event that the planet gear is designed as a stepped planet gear with two toothings, the at least one planet gear can mesh both with the sun gear and also with the ring gear of the planetary gear system.

The planet carrier can have at least a planet holder for a planet gear. Preferably, the planet carrier has a number of planet holders that corresponds to the number of planet gears of the planetary gear system. A planet gear can be rotatably mounted in the planet holder in the use position.

The at least one planet holder can be designed, for example, as a blind hole or as a stepped bore. If the planet holder is designed as a stepped bore, the planet gear can be brought from one side of the stepped bore into the planet holder. From the other side of the stepped bore, an assembly aid can be inserted for example into the planet holder. With the aid of an assembly aid, for example a bolt, a planetary shaft of the planet gear can be supported for example during the assembly of a pinion. If the planet holder is designed as a blind hole, a preferably continuous stepped bore can be dispensed with.

The at least one planet holder can have an insertion opening, through which the at least a planet gear can be inserted into the planet holder in an assembly direction in its use position. In this case, the planet holder can be aligned with its insertion opening in such a way that the assembly direction defined by the planet holder coincides with the assembly direction of the planet carrier in its use position within the housing. The aforementioned insertion opening of the housing and the insertion opening of the planet carrier can each be arranged in axial planes with respect to the axis of rotation of the planetary gear system and/or on the same side of the planetary gear system.

The at least one planet gear is, as previously already indicated, designed as stepped planet gear and has at least two toothings. The at least two toothings of the planet gear can differ from one another, for example have different addendum circle diameters and/or pitch circle diameters and/or operating pitch diameters.

The stepped planet gear has a sun gear toothing meshing with the sun gear of the planetary gear system and a ring gear toothing meshing with the ring gear of the planetary gear system. In this way it is possible to transmit a torque from the sun gear via the planet gear and the ring gear to the planet carrier of the planetary gear system and vice versa.

The toothings can be axially spaced from one another in relation to an axis of rotation of the planet gear. This allows the planet gear with its toothings to be adapted to an axial distance between the ring gear and the sun gear of the planetary gear system.

The addendum circle diameter and/or pitch circle diameter and/or operating pitch diameter of the sun gear toothing of the at least one planet gear can be selected in this case independently of the addendum circle diameter and/or pitch circle diameter and/or operating pitch diameter of the ring gear toothing of the planet gear. When the planet gear is in the operating position, the ring gear toothing can project radially in relation to an axis of rotation of the planet carrier beyond the rear or distal bearing seat of the planet carrier, which is arranged adjacent to the planet carrier insertion end.

In this context, it can be advantageous if at least one planet holder has a side opening aligned transverse to the axis of rotation of the planet carrier, through which the ring gear toothing of the planet gear can protrude in order to engage with an internal toothing of the ring gear.

The ring gear meshing with the ring gear toothing of the at least one planet gear is arranged, as previously mentioned, between two bearing seats of the planet gear. This facilitates an even distribution of the forces transmitted to the planet gear during operation of the planetary gear system. The other bearing seat of the planet gear is arranged between the ring gear toothing and the sun gear toothing of the planet gear. The arrangement of the bearing seat between the ring gear toothing and the sun gear toothing makes it easier to make the planet gear as short as possible axially in relation to its longitudinal axis. This makes it possible to provide a particularly compact planetary gear system.

The at least one planet gear also has a bearing seat between an insertion end of the planet gear in its use position and the ring gear toothing, which has an outer diameter which is smaller than the outer diameter of the ring gear toothing. In this way is it possible to insert the at least one planet gear in one assembly direction from one side and/or as an integral element into its use position within the previously already mentioned planet holder of the planetary gear system. The bearing seat which is at the rear in assembly direction of the planet gear can then pass the ring gear due to its dimension without colliding with the ring gear. This rear bearing seat can also be referred to as the distal bearing seat of the planet gear. A pivot bearing that is arranged on this bearing seat can have an outer diameter that is smaller than the outer diameter of the ring gear toothing of the at least one planet gear. The pivot bearing, which can be a radial bearing, can thus be pushed onto the bearing seat and then inserted together with the planet gear into the planet holder of the planet carrier.

The at least one planet holder can have a bearing seat for an outer side of a pivot bearing, in particular for an outer ring of a pivot bearing, of the at least one planet gear, which is arranged adjacent to the insertion opening of the planet holder. This bearing seat can be arranged in front of the ring gear and/or in front of the aforementioned side opening of the planet holder in the assembly direction of the planet gear in the planet holder. The bearing seat can have an inner diameter that is at least as large as, and preferably larger than, the external diameter of the ring gear toothing of the at least one planet gear. The outer ring of the pivot bearing arranged on this bearing seat can have an outer diameter that is at least as large as, preferably larger than, the outer diameter of the ring gear toothing of the at least one planet gear. This facilitates the introduction of the planet gear from one side into its use position within the planet holder.

The previously mentioned ring gear toothing of the at least one planet gear it can be a helical toothing. The previously mentioned sun gear toothing of the at least one planet gear can also be a helical toothing. A helical toothing can facilitate the smooth running of the planetary gear system and also contribute to a lower noise development.

A helical toothing of the planetary gear system between the at least one planet gear and the sun gear, for example the aforementioned sun gear toothing, and a helical toothing of the planetary gear system between the at least one planet gear and the ring gear, for example the aforementioned ring gear toothing, of the planetary gear system can be matched to each other in such a way that an amount of an effective axial force resulting from axial forces caused by the helical toothing during operation of the planetary gear system is less than 10% of the amount of one, preferably a smallest, of the axial forces caused by the helical toothing. It is particularly advantageous if a helical toothing of the planetary gear system between the at least one planet gear and the sun gear, for example the aforementioned sun gear toothing, and a helical toothing of the planetary gear system between the at least one planet gear and the ring gear, for example the aforementioned ring gear toothing, of the planetary gear system are matched with each other in such a way that in operation of the planetary gear system the axial forces caused by the helical toothings cancel each other out.

The axial forces can also cancel each other out in this sense if a low effective axial force occurs, which results from the axial forces caused by the helical toothings and is due to manufacturing tolerances of the matched helical toothings.

In this way it is possible that at least one planet gear with a comparatively favorable radial bearing is rotatably mounted in the planet carrier, for example by means of small-sized needle roller bearings. Such needle roller bearings are characterized by their high radial load capacity and require little radial installation space. Needle roller bearings are however less suitable for the support of axial forces. Due to the axial forces compensation, which is possible with aid of the helical toothings matched to each other, resulting axial forces can be compensated and the bearing of the at least one planet gear can accordingly be designed in a favorable manner. To support residual axial forces, the planetary gear system can have at least one axial bearing element, which is explained in more detail below.

It may be provided that a ratio of the helix angles of the helical toothings corresponds to a ratio of the operating pitch diameters of the helical toothings. If this condition is fulfilled, this favors a complete or at least extensive mutual cancellation of the axial forces caused by the helical toothings in each case. An operating pitch diameter of the sun gear toothing can for example be 20 mm. An operating pitch diameter of the ring gear toothing can be for example 10 mm. A helix angle of the sun gear toothing can then be, for example, 10°, while a helix angle of the ring gear toothing is 5°. The helix angles of the two helical toothings can point in the same direction. The helix angle of the ring gear toothing can for example be between 2° and 15°. The helix angle of the sun gear toothing can be for example between 4° and 30°.

The at least one planet gear can have a planetary shaft. The sun gear toothing may be formed on a sun pinion, which is arranged on the planetary shaft.

Between planetary shaft and sun pinion, adhesive can be arranged to prevent slipping of the sun pinion. Furthermore, a conical connection can be provided between planetary shaft and sun pinion, via which the sun pinion is connected to the planetary shaft. It is provided in a preferred embodiment of the planetary gear system that both adhesive is arranged and also a conical connection is formed between sun pinion and planetary shaft, so that the sun pinion in this embodiment can be fixed particularly reliably on the planetary shaft.

The sun pinion can be fixed for example with a screw and/or with a nut to the planetary shaft. If a screw is used for fixing of the sun pinion to the planetary shaft, the screw can be screwed into the planetary shaft for example at the front.

A helix angle of the sun gear toothing can be larger or smaller than or the same size as a helix angle of the ring gear toothing of the planet gear, depending on which operating pitch diameters the toothings each have.

In particular in the event that a radial bearing is used as pivot bearing for rotatable bearing of at least one planet gear of the planetary gear system, which, due to its design, is less well suited for absorbing axial forces, it can be advantageous if the planetary gear system has at least an axial bearing element, for example an axial sliding washer, which is set up to absorb axial forces. The at least one axial bearing element can be assigned at least to a pivot bearing for rotatable mounting of the at least one planet gear. If during operation of the planetary gear system axial forces act on the at least one planet gear, these can be absorbed via the at least one axial bearing element and dissipated.

Such axial forces could occur for example due to gravity, if the planetary gear system changes its position in space during its use. For example, this is possible if the planetary gear system is used on an industrial robot or if it is not possible to compensate the axial forces completely.

Preferably, the planetary gear system has at least one axial bearing element of this type for each pivot bearing of each planetary gear, which is designed to absorb axial forces.

In summary, the invention thus relates to a planetary gear system with a housing, a sun gear, a planet carrier, at least one planet gear and a ring gear. The planet carrier is rotatably mounted in the housing. The housing defines an assembly direction for mounting the planet carrier. A bearing seat of the planet carrier for a pivot bearing, which serves for the rotatable mounting of the planet carrier in the housing, which is arranged adjacent to an insertion end of the planet carrier and in the use position of the planet carrier in the assembly direction behind the ring gear, has a diameter which is smaller than an inner diameter, in particular than an addendum circle diameter, of the ring gear.

The invention is explained in more detail below with reference to exemplary embodiments, but is not limited to these exemplary embodiments. Further exemplary embodiments are obtained by combining the features of individual or several claims with one another and/or by combining individual or several features of the exemplary embodiments, wherein:

Figure 1:
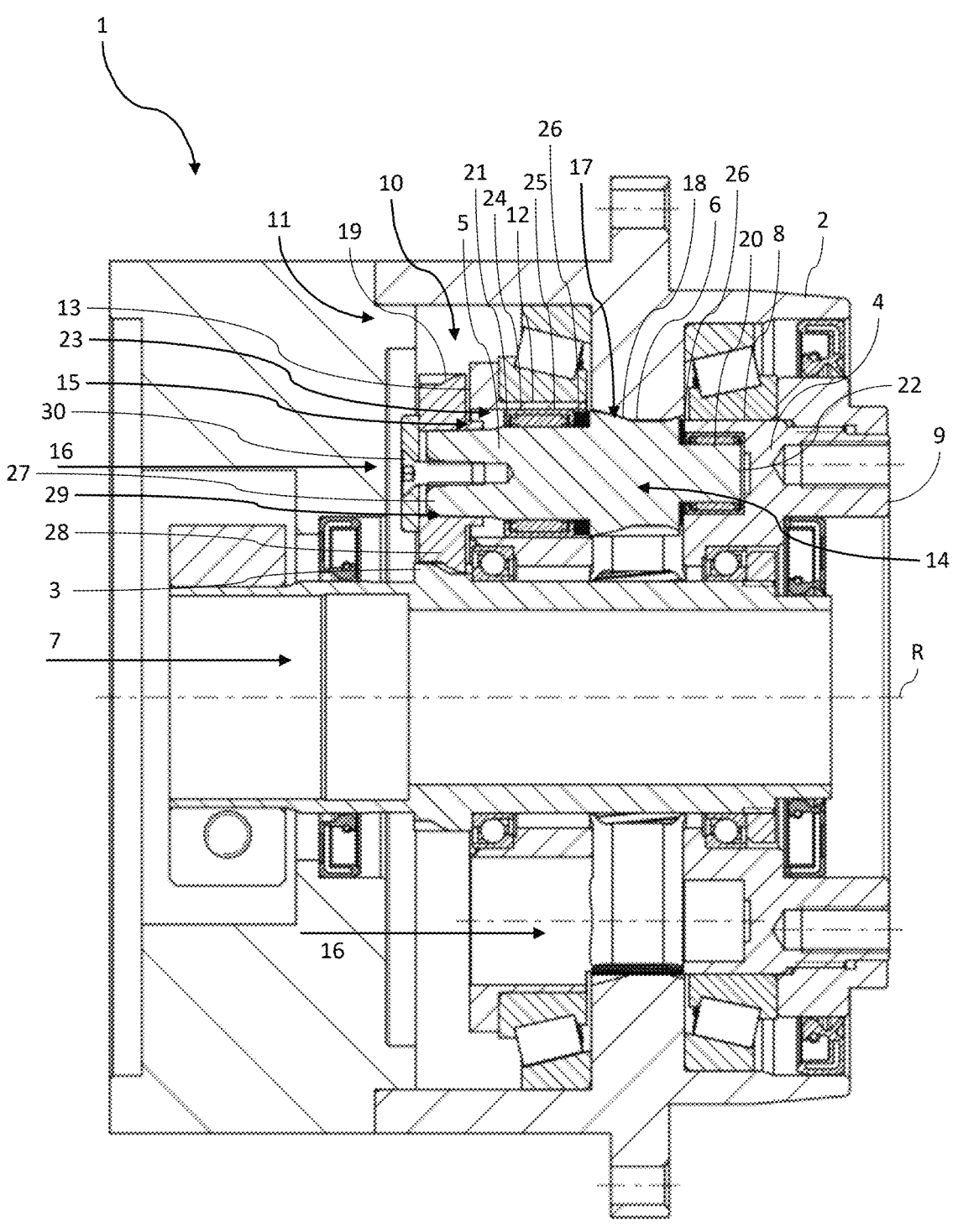
FIG. 1 shows a sectional side view of a planetary gear system, the housing of which defines an assembly direction for mounting a planet carrier of the planetary gear system, wherein a bearing seat of the planet carrier, which is arranged adjacent to an insertion end of the planet carrier and in the use position of the planet carrier in the assembly direction behind a ring gear of the planetary gear system, has a diameter which is smaller than an inner diameter of the ring gear.
Figure 2:
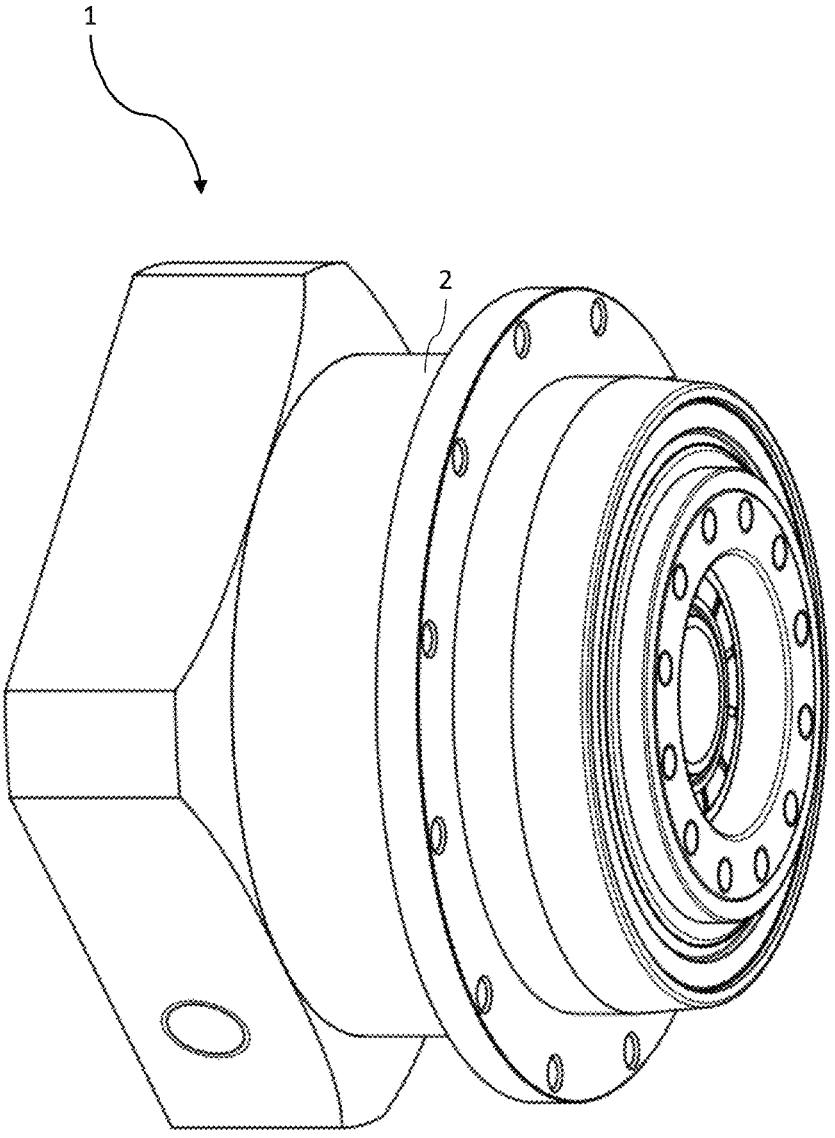
FIG. 2 shows an isometric representation of the planetary gear system from FIG. 1.

All figures show at least parts of a planetary gear system, designated reference sign 1, which is designed as a planetary gear.

DETAILED DESCRIPTION

The planetary gear system 1 comprises a housing 2, a sun gear 3, a planet carrier 4 serving as output shaft and a plurality of planet gears 5 designed as stepped planet gears. In the interior of the housing 2 a ring gear 6 of the planetary gear system 1 is arranged. The planet carrier 5 is mounted inside the housing 2 rotatable relative to the fixed ring gear 6.

Figure 3:
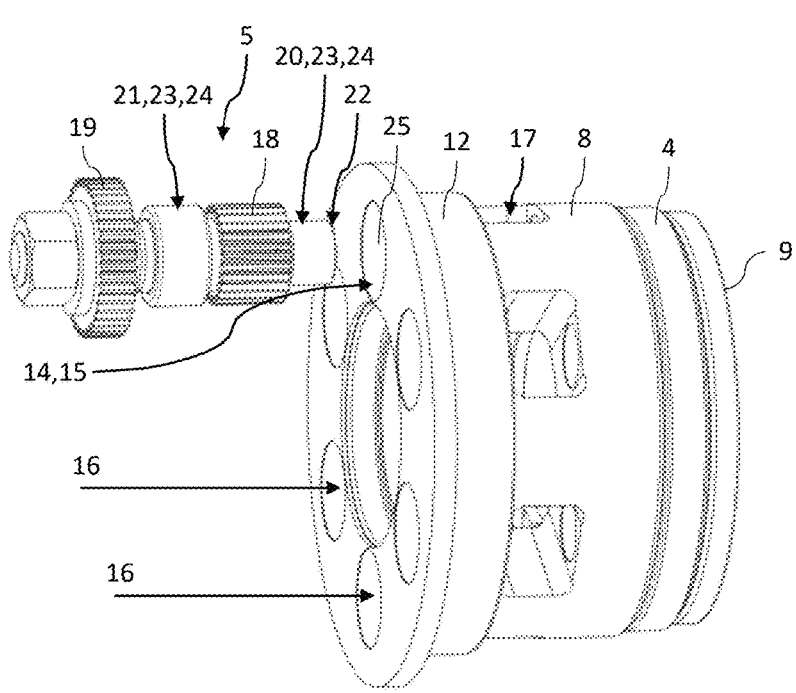
FIG. 3 shows an isometric representation of the planet carrier of the planetary gear system shown in the previous figures with a planet gear provided with spur toothings in front of one of the total of six planet holders of the planet carrier arranged evenly distributed around an axis of rotation of the planet carrier.
Figure 4:
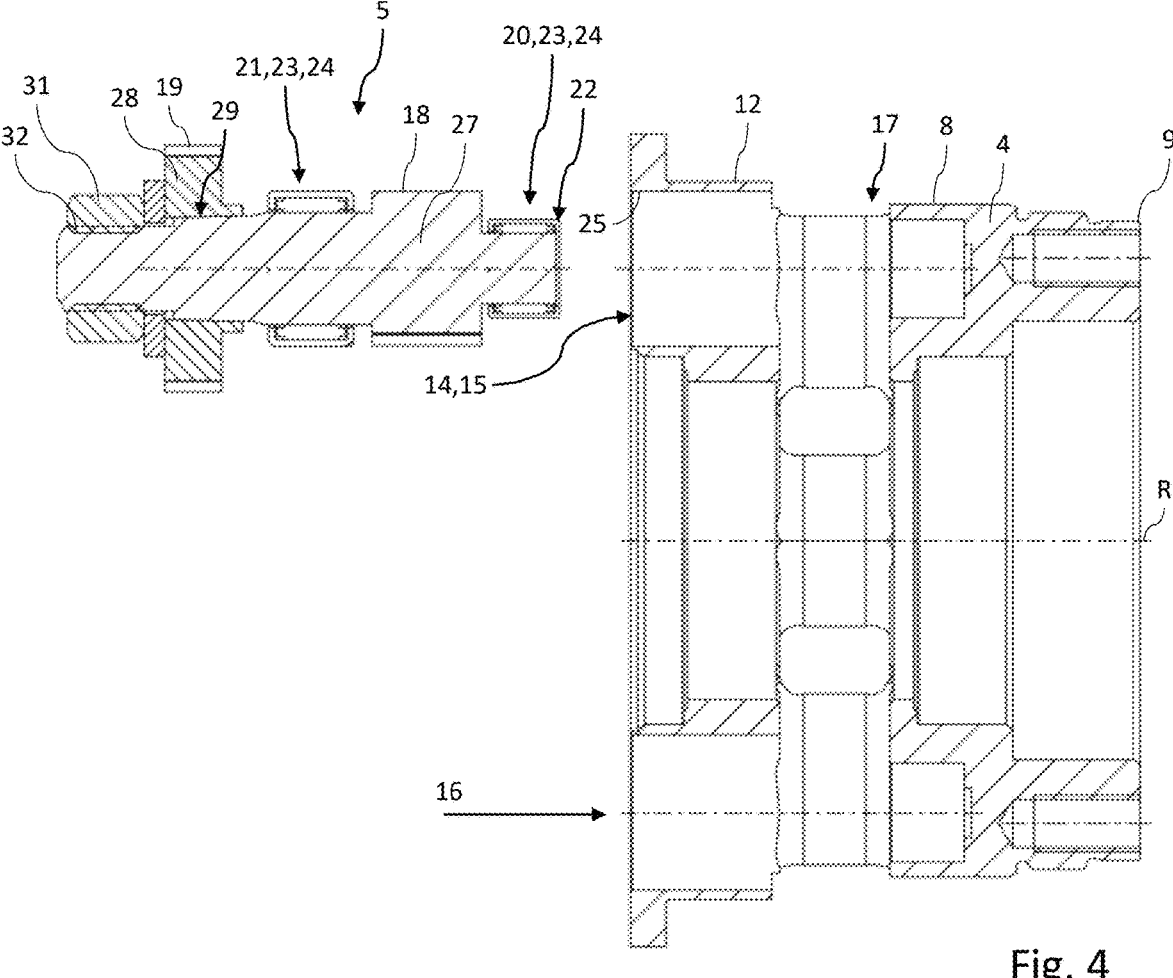
FIG. 4 shows a sectional side view of the planet carrier and planet gear shown in FIG. 3.
Figure 5:
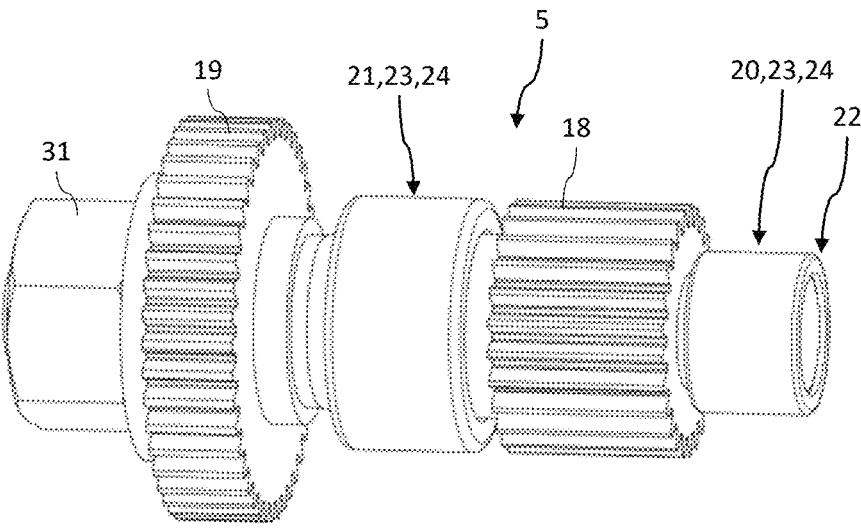
FIG. 5 is a view of a planet gear designed as a stepped planet gear, wherein the planet gear has two axially spaced-apart spur toothings.
Figure 6:
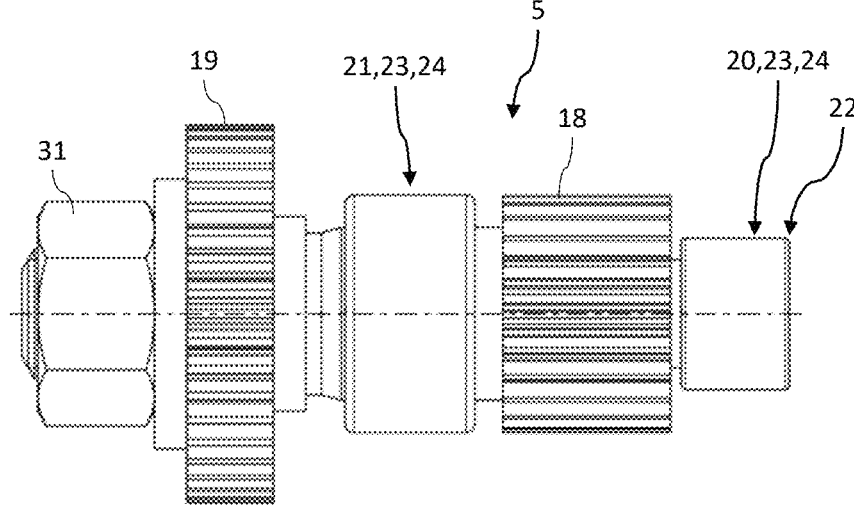
FIG. 6 is another view of a planet gear designed as a stepped planet gear, wherein the planet gear has two axially spaced-apart spur toothings.
Figure 7:
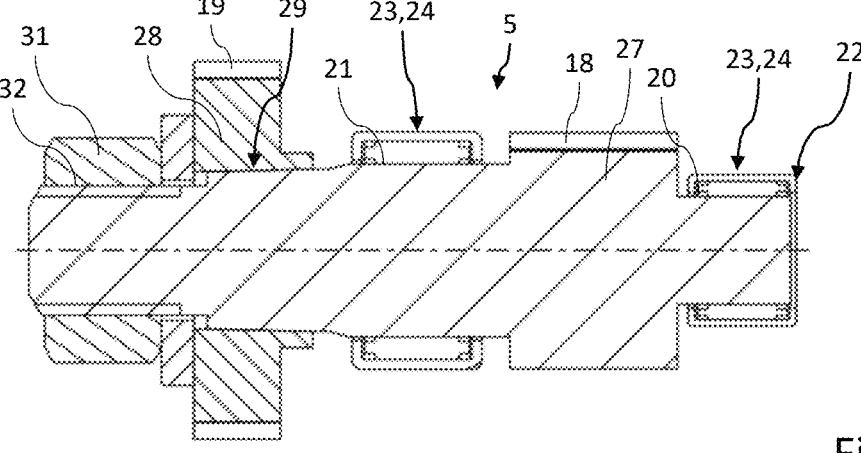
FIG. 7 is another view of a planet gear designed as a stepped planet gear, wherein the planet gear has two axially spaced-apart spur toothings.
Figure 8:
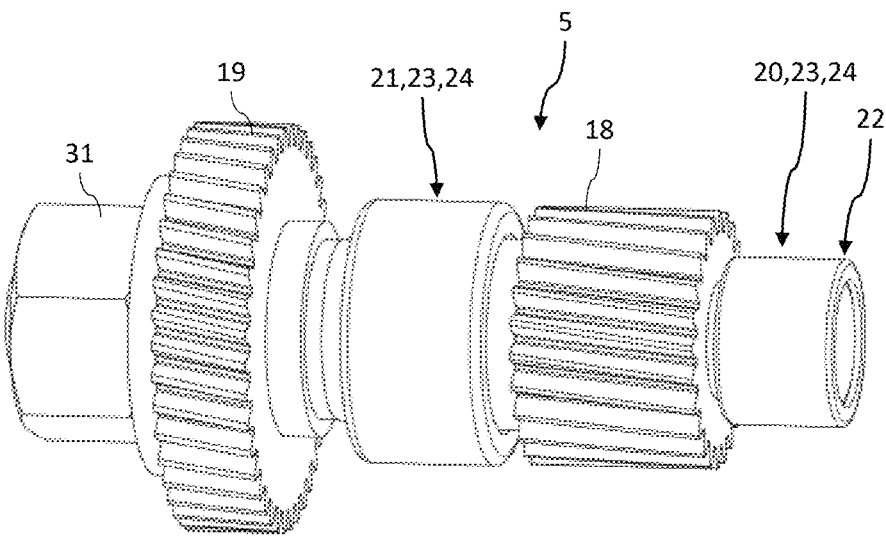
FIG. 8 is a view of the planet gear shown in FIG. 4, which can be used in the planetary gear system shown in FIGS. 1 and 2, wherein the planet gear is designed as a stepped planet gear and has two helical toothings.
Figure 9:
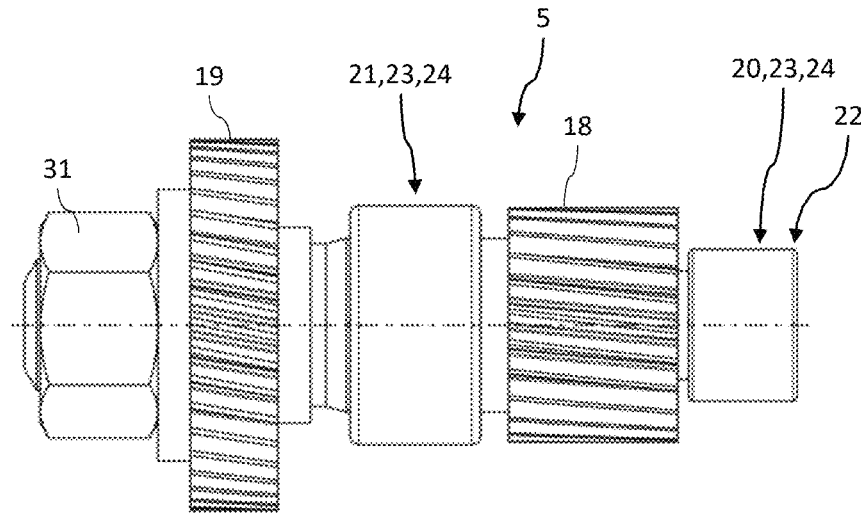
FIG. 9 is another view of the planet gear shown in FIG. 4, which can be used in the planetary gear system shown in FIGS. 1 and 2, wherein the planet gear is designed as a stepped planet gear and has two helical toothings.
Figure 10:
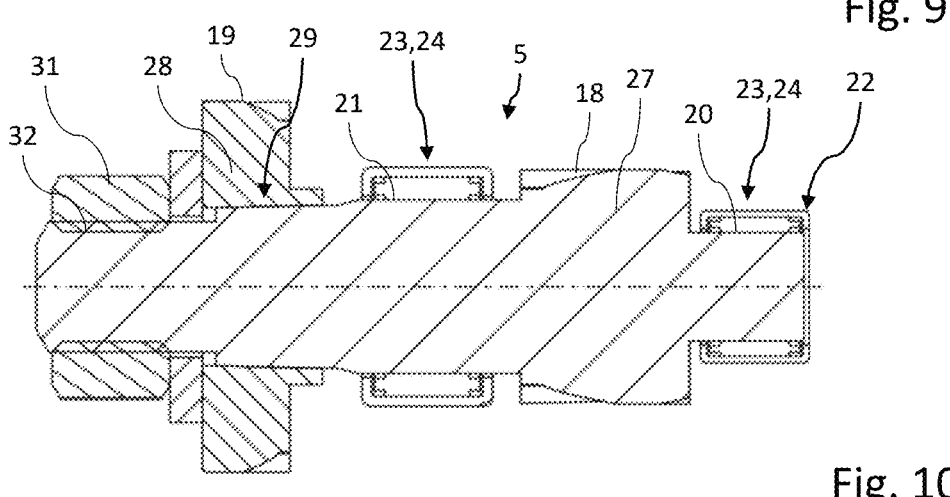
FIG. 10 is another view of the planet gear shown in FIG. 4, which can be used in the planetary gear system shown in FIGS. 1 and 2, wherein the planet gear is designed as a stepped planet gear and has two helical toothings.

FIGS. 3 and 4 show individual views of the planet carrier 4 and a planet gear 5. FIGS. 5, 6 and 7 show a first embodiment of a planet gear 5, which has spur toothings. FIGS. 8, 9 and 10 show a second embodiment of a planet gear 5, which is also designed as stepped planet gear and has two helical toothings. The planet gears 5 of the planetary gear system 1 shown in FIG. 1 are planet gears 5 with helical toothings.

The housing 2 of the planetary gear system 1 shown in the figures defines an assembly direction 7 for mounting the planet carrier 4. The planet carrier 4 has a bearing seat 8 on its outer side, which is arranged adjacent to an insertion end 9 of the planet carrier 4 and in use position of the planet carrier 4 in assembly direction 7 behind the ring gear 6 and can also be referred to as a distal bearing seat. This distal bearing seat 8 has an outer diameter which is smaller than an inner diameter, namely smaller than the addendum circle diameter of the ring gear 6.

In this way the planet carrier 4 can be inserted into its use position within the housing 2 starting from a side of the housing 2. This favors the integral design of the planet carrier 5, which can be seen particularly well in the FIGS. 3 and 4.

The housing 2 has a planet carrier holder 10 with an insertion opening 11 for the planet carrier 4. The planet carrier holder 10 and its insertion opening 11 predefine the assembly direction 7 of the planet carrier 4.

The ring gear 6 is arranged within the planet carrier holder 10 of the housing 2 and is also non-rotatable. On its outer side, the planet carrier 4 has a total of two bearing seats which are spaced apart axially from one another in relation to its axis of rotation R, namely the already previously mentioned rear or distal bearing seat 8 and a front or proximal bearing seat 12 on. The front bearing seat 12 of the planet carrier 4 is the bearing seat which in the use position of the planet carrier 4 is arranged closer to the insertion opening 11 of the planet carrier holder 10 for the planet carrier 4. The ring gear 6 is arranged between the two bearing seats 8 and 12 when the planet carrier 4 is in the use position. Both bearing seats 8 and 12 are formed on an outer side of the planet carrier 4 and are used for the rotatable mounting of the planet carrier 4 in the housing 2 of the planetary gear system.

The front bearing seat 12 of the planet carrier 4 is arranged in the assembly direction 7 and in the use position of the planet carrier 4 in front of the ring gear 6 and also adjacent to an end 13 of the planet carrier 4 facing away from the insertion end 9 of the planet carrier 4. The front bearing seat 12 has a diameter which is the larger than the inner diameter, namely larger than the addendum circle diameter of the ring gear 6 and larger than a diameter of the rear bearing seat 8 of the planet carrier 4 adjacent to the insertion end 9 of the planet carrier 4.

The planet gears 5 are rotatably mounted in the planet carrier 4. The planet gears 5 mesh both with the sun gear 3 and also with the ring gear 6 of the planetary gear system 1. The planet carrier 4 has a planet holder 14 for each of the planet gears 5. In summary, the planet carrier 4 is provided with six planet holders 14.

Each planet holder 14 is formed as a blind hole and has an insertion opening 15, through which the planet gears 5 can be inserted in an assembly direction 16 into their use position within the planetary holders 14.

The assembly direction 16 of the planet gears 5 coincides with the assembly direction 7 of the planet carrier 4. The planet carrier 4 and the planet gears 5 can therefore be mounted starting from the same side of the housing 2. The planet carrier 4 has for each of its planet holders 14 a side opening 17. Through the side openings 17, the planetary holders 14 of the planet carrier 4 are laterally accessible. Ring gear toothings 18 of the planet gears 5, which are designed as stepped planet gears, can protrude through the side openings 17 in order to engage with the ring gear 6 of the planetary gear system 1.

As previously already mentioned, the planet gears 5 are designed as stepped planet gears and have two toothings 18 and 19. The toothings 18 and 19 are axially spaced from each other in relation to an axis of rotation of the respective planet gear 5. Both toothings 18 and 19 differ from each other, for example by their addendum circle diameter and/or pitch circle diameter and/or operating pitch diameter.

Each planet gear 5 has a sun gear toothing 19 meshing with the sun gear 3 of the planetary gear system 1 and a ring gear toothing 18 meshing with the ring gear 6 of the planetary gear system 1.

In particular, the sectional views of the planetary gear system 1 and its components make it clear that the ring gear toothings 18 protrude through the side openings 17 of the planet carrier 4 and are in mesh with the ring gear 6 of the planetary gear system 1.

The ring gear toothings 18 of the planet gears 5 meshing with the ring gear 6 are arranged in each case between two bearing seats 20 and 21 of the respective planet gear 5. Each planet gear 5 has a bearing seat 20, which is arranged between an insertion end 22 of the respective planet gear 5 and the ring gear toothing 18.

This bearing seat 20 has a diameter, which is smaller than the outer diameter of the ring gear toothing 18. On this bearing seat 20 a pivot bearing 23, namely a radial bearing, is arranged. This pivot bearing 23, namely its outer ring 24, has an outer diameter which is at most as large as and preferably smaller than the outer diameter of the ring gear toothing 18 of the planet gear 5. Due to this dimension, it is possible to move the bearing seat 20 together with the pivot bearing 23 arranged on the bearing seat 20 past the ring gear 6 into its target position shown for example in FIG. 1 and to bring the ring gear toothing 18 of the planet gear 5 into engagement with the ring gear 6 of the planetary gear system 1.

The figures also show that the bearing seat labeled 21 is arranged between the respective ring gear toothing 18 and the respective sun gear toothing 19 of the planet gear 5 for each of the planet gears 5.

Each planet holder 14 has a bearing seat 25 for an outer ring 24 of a pivot bearing 23 of a planet gear 5 to be positioned in the planet holder 14, adjacent to the insertion opening 15 in the planet holder 14 and before the side opening 17. This bearing seat 25 is located in front of the ring gear 6 in the mounting direction 16 of the planet gear 5 and is thus arranged between the axial insertion opening 15 and the radial side opening 17 of the planet holder 14.

An inner diameter of this bearing seat 25 is at least as large as the outer diameter of the ring gear toothing 18 of the planet gear 5, which is to be inserted into the planet holder 14. The outer ring 24 of the pivot bearing 23 arranged on this bearing seat 25 then logically has an outer diameter that is at least as large as and preferably larger than the outer diameter of the ring gear toothing 18 of the planetary gear 5. This ensures that the planet holder 14 offers sufficient space in its area downstream of the insertion opening 15 to bring the ring gear toothing 18 of the planet carrier 5 into their position of use on the ring gear 6 of the planetary gear system 1.

FIGS. 8-10 show an embodiment of a planet gear 5, which is also designed as stepped planet gear and has a ring gear toothing 18 and a sun gear 19, which are each designed as helical toothings.

The planet gear 5 shown in FIGS. 8-10 therefore enables helical toothing of a planetary gear system 1 between the sun gear 3 and the planet gear 5 and further helical toothing of the planetary gear system 1 between the planet gear 5 and the ring gear 6 of the planetary gear system 1.

The helical toothings are thus matched to each other in such a way that in operation of the planetary gear system 1 axial forces caused by the helical toothings 18, 19 cancel each other out, or at least that an amount of an effective axial force resulting from the respective axial forces is less than 10% of the amount of the smaller of the axial forces caused by the helical toothings 18, 19.

Optimally, a ratio of the helix angles of the two helical toothings 18, 19 corresponds to a ratio of the operating pitch diameters of the helical toothings 18, 19 in order to achieve the best possible compensation of the axial forces caused by the helical toothings in each case.

In this case, a helix angle of the sun gear toothing 19 can be greater or also less than or the same size as a helix angle of the ring gear toothing 18 of the planet gear 5, depending on which and/or pitch diameters the toothings 18 and 19 have.

The planetary gear system 1 has for each planet gear 5 two axial bearing elements 26 in form of axial sliding washers. The axial bearing elements 26 are assigned to the pivot bearings 23 of the planet gears 5 and are set up for absorption of axial forces. The axial bearing elements 26 are arranged on both sides of the ring gear toothing 18 of the respective planet gear 5.

The axial bearing elements 26 are used when the axial force compensation provided by the ring gear toothing 18 and the sun gear toothing 19 of the planet gears 5 is not completely successful. The axial bearing elements 26 can also be advantageous if axial forces still act on the planet gears 5 of the planetary gear system 1 in certain cases, for example due to a change in position of the planetary gear system 1 in space, and must be dissipated.

If the axial forces caused by the helical toothings of the ring gear 18 and the sun gear 19 should be of different magnitudes, the helical toothings 18 and 19 are nevertheless at least matched to each other in such a way that an amount of an effective axial force resulting from the axial forces of different magnitudes is less than 10% of the amount of the smaller of the two axial forces caused by the helical toothings 18, 19. Such a low resulting axial force can be absorbed by the aforementioned axial bearing elements 26.

The figures show that the planet gears 5 each have a planetary shaft 27. The sun gear toothings 19 of the planet gears 5 are each formed on a sun pinion 28, which is arranged on the planetary shaft 27 of the respective planet gear 5. In order to secure the sun pinion 28 in its position to the respective planetary shaft 27, adhesive is inserted between sun pinion 28 and planetary shaft 27. Furthermore, each sun pinion 28 is connected to its planetary shaft 27 via a conical connection 29. The conical connection 29 comprises an outer cone on the planetary shaft 27 and an inner cone on the sun pinion 28.

The figures show further that the sun pinions 28 are fixed either with a screw 30 or with a nut 31 to the respective planetary shaft 27. In the variant of the planetary gear system 1 in which the sun pinions 28 are fixed to the planetary shaft 27 by means of screws 30, it can be useful to press the respective sun pinion 28 with a pressing tool onto the planetary shaft 27.

In the variant of the planetary gearbox 1 in which the sun pinions 28 are fixed to the respective planetary shaft 27 by means of a nut 31, the sun pinion 28 can be pressed onto the cone 29 of the planetary shaft 27 by tightening the nut 31. The nut 31 is screwed onto a threaded section 32 of the planetary shaft 27.

The invention claimed is:

1. A planetary gear system comprising:
a housing;
a sun gear;
a planet carrier;
at least one planet gear; and
a ring gear;
wherein the planet carrier is rotatably mounted in the housing;
wherein the housing defines an assembly direction for assembly of the planet carrier and the planet carrier has a bearing seat on its outer side which is arranged adjacent to an insertion end of the planet carrier and behind the ring gear in the assembly direction in the use position of the planet carrier and has an outer diameter which is smaller than an addendum circle diameter, of the ring gear;
wherein a bearing seat of the planet carrier, which is arranged in front of the ring gear and/or adjacent to an end of the planet carrier facing away from the insertion end in the assembly direction and in the use position of the planet carrier, has a diameter which is larger than the addendum circle diameter, of the ring gear and/or larger than a diameter of the bearing seat of the planet carrier adjacent to the insertion end, characterized in that the at least one planet gear is designed as a stepped planet gear, has two bearing seats and at least two toothings, namely a sun gear toothing meshing with the sun gear and a ring gear toothing meshing with the ring gear, in that the ring gear toothing of the planet gear is arranged between the two bearing seats of the planet gear, in that a bearing seat of the planet gear is arranged between an insertion end of the planet gear and the ring gear toothing;
wherein this bearing seat has an outer diameter which is smaller than the outer diameter of the ring gear toothing, in that the other bearing seat of the planet gear is arranged between the ring gear toothing and the sun gear toothing of the planet gear, in that the planet carrier has at least one planet holder for the at least one planet gear, and in that the planet holder has an insertion opening through which the at least one planet gear can be inserted into the planet holder in an assembly direction in its use position;

wherein the at least one planet holder has, adjacent to its insertion opening, a bearing seat for an outer ring, of a pivot bearing of the at least one planet gear, which has an inner diameter which is at least as large as the outer diameter of the ring gear toothing of the at least one planet gear, and wherein the pivot bearing arranged on this bearing seat has an outer diameter which is at least as large as the outer diameter of the ring gear toothing of the at least one planet gear.

2. A planetary gear system according to claim 1, wherein the housing has the planet carrier holder with the insertion opening for the planet carrier, through which the assembly direction of the planet carrier is defined, and/or wherein the planet carrier is formed in one piece.

3. A planetary gear system according to claim 1, wherein the planet carrier has on its outer side in relation to its axis of rotation (R) two bearing seats (8, 12) which are axially spaced apart from one another and between which the ring gear is arranged when the planet carrier is in the use position.

4. A planetary gear system according to claim 1, wherein the planet carrier has an output shaft, or is designed as an output shaft.

5. A planetary gear system according to claim 1, wherein the at least one planet gear is rotatably mounted in the planet carrier and meshes with the sun gear and with the ring gear.

6. A planetary gear system according to claim 1, wherein the assembly direction of the planet carrier into the housing and the assembly direction of the at least one planet gear into the planet holder coincide, and/or wherein the planet holder is designed as a blind hole or as a stepped bore.

7. A planetary gear system according to claim 1, wherein the planet carrier has at least one side opening into the planet holder of the planet carrier.

8. A planetary gear system according to claim 1, wherein the two toothings of the planet gear differ, and/or wherein the two toothings are axially spaced from each other with respect to an axis of rotation of the planet gear.

9. A planetary gear system according to claim 1, wherein the planet holder has a side opening aligned transversely to the axis of rotation (R) of the planet carrier for the ring gear toothing of the planet gear.

10. A planetary gear system according to claim 1, wherein a radial bearing, is arranged on the bearing seat, which is arranged between the insertion end of the planet gear and the ring gear toothing, the outer diameter of which is smaller than the outer diameter of the ring gear toothing of the at least one planet gear.

11. A planetary gear system according to claim 10, wherein the ring gear toothing of the at least one planet gear is a helical toothing and/or wherein the sun gear toothing of the at least one planet gear is a helical toothing.

12. A planetary gear system according to claim 1, wherein a helical toothing of the planetary gear system between the at least one planet gear and the sun gear and a helical toothing of the planetary gear system between the at least one planet gear and the ring gear of the planetary gear system are matched to each other in such a way that an amount of an effective axial force resulting from axial forces caused by the helical toothings during operation of the planetary gear is less than 10% of an amount of a smallest of the axial forces caused by the helical toothings in each case, or in that axial forces caused by the helical toothings during operation of the planetary gear cancel each other out.

13. A planetary gear system according to claim 12, wherein a ratio of the helix angles of the helical toothings corresponds to a ratio of the operating pitch diameters of the helical toothings.

14. A planetary gear system according to claim 1, wherein the at least one planet gear has a planetary shaft and the sun gear toothing is formed on a sun pinion which is arranged on the planetary shaft.

15. A planetary gear system according to claim 1, wherein the planetary gear system has at least one axial sliding washer, which is assigned to each pivot bearing of the planet gear.

* * * * *